Dec. 21, 1965   P. G. PHLIPS   3,224,077
METHOD OF FORMING AN ELECTRICAL CONDUCTOR FOR
STORAGE BATTERY TERMINALS
Filed Dec. 28, 1962   2 Sheets-Sheet 1

INVENTOR.
PAUL G. PHLIPS
BY Howard S. Reiter

Dec. 21, 1965  P. G. PHLIPS  3,224,077
METHOD OF FORMING AN ELECTRICAL CONDUCTOR FOR
STORAGE BATTERY TERMINALS
Filed Dec. 28, 1962  2 Sheets-Sheet 2
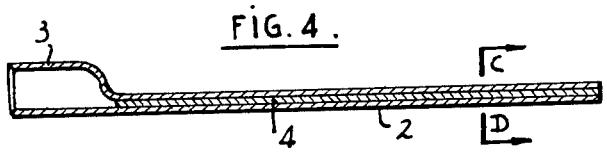
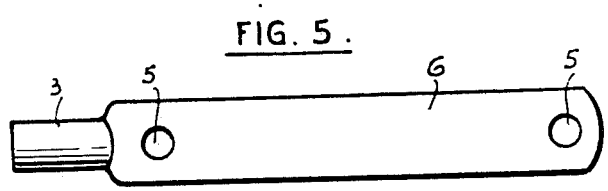
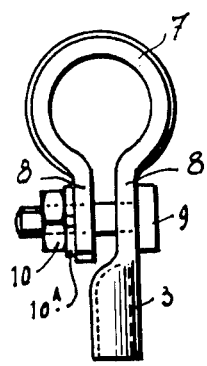
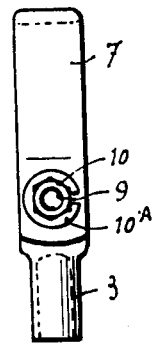
INVENTOR.
PAUL G. PHLIPS
BY
Howard A Reuter 3,224,077
METHOD OF FORMING AN ELECTRICAL CONDUCTOR FOR STORAGE BATTERY TERMINALS
Paul Gustaaf Phlips, Hombeek, Belgium, assignor to Burndy Corporation, a corporation of New York
Filed Dec. 28, 1962, Ser. No. 247,938
1 Claim. (Cl. 29—155.55)

The present invention relates to electric connectors for storage battery terminals.

Its intention is to facilitate the production and manufacture of these objects and at the same time obtain certain advantages in use, in particular the possibility of making the bond with the cable by crimping.

According to the invention the connector is constituted essentially by a core of elastic metal such as steel and an envelope of conductive metal such as copper or brass.

In the practical embodiment of the invention we can start with a sheet or tube of elastic metal designed to form the core and a tube of conductive metal designed to constitute the envelope.

The whole is deformed to fit on a battery terminal on which it is held by tightening with a bolt or by the elastic force of the core.

The attachment of the connector to the conductor is done preferably by crimping but it can also be done by soldering or brazing.

We will describe below, by way of non-limiting example, with the aid of the attached drawings (FIGS. 1 to 5), how these connections can be made.

Figure 1:
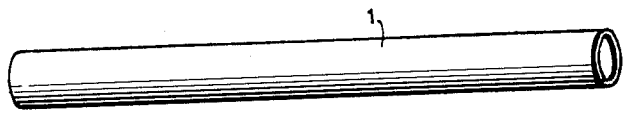
Figure 2:
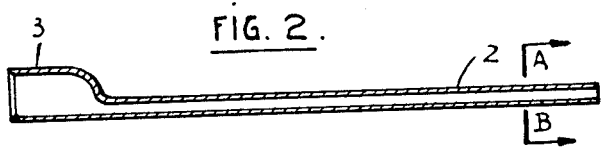
Figure 2A:
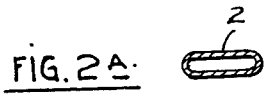
Figure 3:
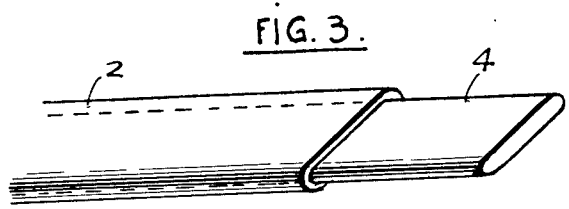

FIG. 1 is an elevation of the tube alone;
FIG. 2 is a view in longitudinal section of the partly flattened tube;
FIG. 2A is a section through line A—B in FIG. 2;
FIG. 3 is a perspective view;
FIG. 4 is a view in longitudinal section of the connector assembled but not bent;
FIG. 4A is a section along line C—D in FIG. 4;
FIG. 5 is a plan view; and
FIGS. 6 and 7 are views in elevation and plan, respectively, of the connector.

To manufacture such a terminal we can start with a tube of conductive metal (FIG. 1) which is flattened over the greater part of its length as shown at 2 (FIG. 2), leaving a tubular part 3 at one end. This flattening is done until the inner walls are separated by the thickness of a strip of elastic steel 4 (FIG. 3) which is introduced into the flattened part. The whole then assumes the form shown in FIGS. 4 and 4A.

We can also start with a steel tube whose outer diameter corresponds to the inner diameter of a tube of conductive metal into which the steel tube is introduced to the desired length. The two tubes are then flattened together as a unit. At this moment whatever the original form of the steel core, the manufacture continues as follows:

The part is drilled (at 5) at the two ends of its flattened part 6 (FIG. 5). The two ends are then bent together and the central part of the flat section is rolled in the form of a cylinder so that the drilled parts face each other. A conical punch is then sunk into the cylindrical part 7 to give it the conicity of the battery terminal.

The finished connector has the form shown in FIGS. 6 and 7 and comprises the flattened central part 7 rolled in the form of a cylinder; the folded ends 8 of the flattened part; the tightener bolt 9 (with nut 10 and lockwasher 10A) introduced in the holes 5; the part 3 remains tubular to receive the cable.

The bonding of such a connector with the cable can be done by crimping, thereby eliminating the work of soldering which requires skilled and specialized labor, facilitates installation and insures better electric continuity and a better mechanical bond.

Another advantage is that the core of the conductor cable is better protected from corrosion by acid vapors.

Furthermore the volume is reduced with respect to existing connectors. The crimped part can be protected by a sleeve of insulating material partly covering the insulation of the conductor.

The copper tube, at the point of its connection with the conductor, can have a form permitting it to be clamped onto the insulation of the conductor. The whole can be protected against corrosion by an adequate covering. With the connector in place on the terminal, the whole can be protected by an insulating hood.

I claim:
The method of forming an electrical connector for storage battery terminals so as to provide such a connector with an improved combination of resiliency and electrical conductivity, comprising the steps of: inserting an elongate body of highly elastic metal having a given length into a hollow, tube-like body of highly conductive metal having an axial length greater than said given length; deforming a first portion of the tube-like body into substantially flat strip form surrounding and securely engaging substantially the entire body of elastic metal, while allowing a second portion of said tube-like body to remain substantially undeformed; and subsequently further deforming said first portion into arcuately curved cylindrical form suitable for resiliently encircling and gripping a battery terminal.

References Cited by the Examiner
UNITED STATES PATENTS

| | | | |
|---|---|---|---|
| 905,812 | 12/1908 | Gilling | 339—251 |
| 1,873,930 | 8/1932 | Edmonson | 339—228 |
| 2,476,886 | 7/1949 | Miller et al. | 339—278 |

FOREIGN PATENTS

| | | |
|---|---|---|
| 1,094,331 | 12/1960 | Germany. |

JOHN F. CAMPBELL, Primary Examiner.
JOSEPH D. SEERS, Examiner.